(12) United States Patent
Garcen et al.

(10) Patent No.: US 6,581,121 B1
(45) Date of Patent: Jun. 17, 2003

(54) MAINTENANCE LINK SYSTEM AND METHOD

(75) Inventors: Sean Garcen, Hudson, MA (US); Thomas A. Manning, Northborough, MA (US); Stephen A. Caldara, Sudbury, MA (US); Edward N. Kittlitz, Maynard, MA (US)

(73) Assignee: Telica, Inc., Marlboro, MA (US)

( * ) Notice: Subject to any disclaimer, the term of this patent is extended or adjusted under 35 U.S.C. 154(b) by 176 days.

(21) Appl. No.: 09/790,836

(22) Filed: Feb. 22, 2001

Related U.S. Application Data

(60) Provisional application No. 60/185,008, filed on Feb. 25, 2000.

(51) Int. Cl.[7] .............................................. G06F 13/00
(52) U.S. Cl. ......................... 710/300; 710/302; 700/3
(58) Field of Search ................................. 710/300, 302; 455/181.1; 361/728, 729, 784, 788; 370/248, 217, 463

(56) References Cited

U.S. PATENT DOCUMENTS

| | | | | |
|---|---|---|---|---|
| 4,542,380 A | * | 9/1985 | Beckner et al. | 340/825.5 |
| 4,742,335 A | * | 5/1988 | Vogt | 340/518 |
| 4,907,225 A | * | 3/1990 | Gulick et al. | 370/463 |
| 5,194,846 A | * | 3/1993 | Lee et al. | 340/505 |
| 5,530,901 A | * | 6/1996 | Nitta | 710/28 |
| 5,561,806 A | * | 10/1996 | Fitchett et al. | 709/250 |
| 5,703,871 A | * | 12/1997 | Pope et al. | 370/248 |
| 6,034,956 A | * | 3/2000 | Olnowich et al. | 370/388 |
| H1859 H | * | 9/2000 | Asthana et al. | 370/217 |
| 6,199,130 B1 | * | 3/2001 | Berglund et al. | 710/302 |
| 6,233,294 B1 | * | 5/2001 | Bowers et al. | 375/356 |
| 6,456,191 B1 | * | 9/2002 | Federman | 340/10.2 |

\* cited by examiner

Primary Examiner—Leo Picard
Assistant Examiner—Michael D Masinick
(74) Attorney, Agent, or Firm—Hale and Dorr LLP

(57) ABSTRACT

A system and method for monitoring and maintaining a plurality of modules are described. Each module of the plurality of modules includes at least one link slave device, and a link controller is connected to link slave devices via a plurality of individual serial, bidirectional connections. The link slave devices and the link controller include protocol logic for communication according to a bidirectional protocol. At predefined time segments and predefined periodicity, the link slave devices drive the corresponding bidirectional link to the controller to provider maintenance information to the controller. At other predefined time segments, the controller drives the bidirectional link to issue commands to the link slave devices. The link slave devices and the link controller include protocol logic for communicating according to a protocol in which all slave devices communicate to the link controller at substantially the same period of time so that the latency for collecting information from the slave devices is independent of the number of such devices.

15 Claims, 4 Drawing Sheets

| FRAME/ STATUS 205 | ML0 210 | ML1 215 | ML2 220 | ML3 225 | ML4 230 | ML5 235 | ML6 240 | ML7 245 | ML8 250 | ML9 255 | ML10 260 | RSVD 265 |

| FRAME NUMBER 305 | BANK SELECT 310 | PARITY ACK 315 | RESERVED | INTERRUPT STATUS WORD 320 |

FIG. 3

| MLC TO MLS (CMD, ADDR., DATA) 405 | RESERVED 415 | MLS TO MLC (STATUS, DATA) 410 |
|---|---|---|

FIG. 4

| BIT POS | DESCRIPTION | DIR | BIT POS | DESCRIPTION | DIR |
|---|---|---|---|---|---|
| | FRAME/STATUS | | | ML 2 | |
| 0 – 4 | FRAMING PATTERN 1110 | S->L | 384 – 385 | COMMAND | S->L |
| 5 – 7 | FRAME NUMBER | S->L | 386 – 389 | ACTIVE BYTE LANES | S->L |
| 8 | ATM CONNECTION MEMORY BANKSEL | S->L | 390 – 419 | 28 BIT ADDRESS | S->L |
| 9 – 10 | TURN AROUND SWITCH TO LINE CARD | S->L | 420 – 451 | 32 BIT DATA | S->L |
| 12 | PARITY ACKNOWLEDGE | L->S | 452 | COMMAND PARITY | L->S |
| 13 – 31 | RESERVED | | 453 – 455 | TURN AROUND SWITCH TO LINE CARD | |
| 32 – 63 | INTERRUPT STATUS WORD | L->S | 456 – 459 | STS\ACK | L->S |
| 65 | ISR PARITY BIT | L->S | 460 – 491 | RETURN 32 BIT DATA FIELD | L->S |
| 66 – 127 | TURN AROUND LINE TO SWITCH CARD | | 492 | RETURN PARITY | L->S |
| | ML 0 | | | ML 6 | |
| 128 – 129 | COMMAND | S->L | 896 – 897 | COMMAND | S->L |
| 130 – 133 | ACTIVE BYTE LANES | S->L | 898 – 901 | ACTIVE BYTE LANES | S->L |
| 134 – 163 | 28 BIT ADDRESS | S->L | 902 – 931 | 28 BIT ADDRESS | S->L |
| 164 – 195 | 32 BIT DATA | S->L | 932 – 963 | 32 BIT DATA | S->L |
| 196 | COMMAND PARITY | S->L | 964 | COMMAND PARITY | S->L |
| 197 – 199 | TURN AROUND SWITCH TO LINE CARD | | 965 – 967 | TURN AROUND SWITCH TO LINE CARD | |
| 200 – 203 | STS\ACK | L->S | 968 – 971 | STS\ACK | L->S |
| 204 – 235 | RETURN 32 BIT DATA FIELD | L->S | 972 – 1003 | RETURN 32 BIT DATA FIELD | L->S |
| 236 | RETURN PARITY | L->S | 1004 | RETURN PARITY | L->S |
| | ML 1 | | | ML 10 | |
| 256 – 257 | COMMAND | S->L | 1408 – 1409 | COMMAND | S->L |
| 258 – 261 | ACTIVE BYTE LANES | S->L | 1410 – 1413 | ACTIVE BYTE LANES | S->L |
| 262 – 291 | 28 BIT ADDRESS | S->L | 1414 – 1443 | 28 BIT ADDRESS | S->L |
| 292 – 323 | 32 BIT DATA | S->L | 1444 – 1475 | 32 BIT DATA | S->L |
| 324 | COMMAND PARITY | S->L | 1476 | COMMAND PARITY | S->L |
| 325 – 327 | TURN AROUND SWITCH TO LINE CARD | | 1477 – 1479 | TURN AROUND SWITCH TO LINE CARD | |
| 328 – 331 | STS\ACK | L->S | 1480 – 1483 | STS\ACK | L->S |
| 332 – 363 | RETURN 32 BIT DATA FIELD | L->S | 1484 – 1515 | RETURN 32 BIT DATA FIELD | L->S |
| 364 | RETURN PARITY | L->S | 1516 | RETURN PARITY | L->S |
| L->S LINE CARD TO SWITCH CARD | | | S->L SWITCH CARD TO LINE CARD | | |

FIG. 5

MAINTENANCE LINK SYSTEM AND METHOD

CROSS-REFERENCE TO RELATED APPLICATION

This application claims priority from provisional application No. 60/185,008, filed Feb. 25, 2000, which is expressly incorporated by reference.

BACKGROUND OF THE INVENTION

1. Field of the Invention

This invention relates to maintenance and fault tolerance of large electronic systems, such as large telecommunication switching systems.

2. Discussion of Related Art

Modern computer and communication systems typically use a multitude of cards interconnected, for example, through a backplane. Preferably the system is architected so that it is scalable, allowing other cards to be added to the system.

Changes in operating condition of these cards need to be communicated to equipment operators so that they know whether the equipment is faulty or working. Consequently, there is a need for a mechanism to communicate information from the cards to a central point to indicate the existence of faults in a timely manner. In this fashion, corrective action can be taken to eliminate or minimize any service disruption. This mechanism must be capable of handling the changing configuration of the system, for example, if cards are added or subtracted.

In addition to reporting changes in operating condition, the central point must be able to control devices on the cards for maintenance and configuration types of operations, for example, by accessing and setting state on the various cards. Moreover, these activities typically cannot rely on much of the functionality of the cards being operational.

To achieve high-availability, card redundancy is typically employed so that one card may provide a service while another card is being maintained or repaired. The maintenance or repair operation may be to correct a fault or to upgrade the capability of the card. Card redundancy can be employed at the central point (or control card), the cards in communication with the central point, or both.

SUMMARY

One feature and advantage of the invention is that it provides a scalable maintenance link system in which the cards may communicate faults, status or interrupts to the central point with deterministic latency regardless of the number of such cards.

Another feature and advantage of the invention is that the maintenance link system is highly reliable without requiring significant and sometimes scarce resources such as a significant number of back- or mid-plane traces.

In accordance with the invention, a system and method for monitoring and maintaining a plurality of modules is provided. Each module of the plurality of modules includes at least one link slave device, and a link controller is connected to link slave devices via a plurality of individual serial, bidirectional connections. The link slave devices and the link controller include protocol logic for communicating according to a bidirectional protocol. At predefined time segments and predefined periodicity, the link slave devices drive the corresponding bidirectional link to the controller to provide maintenance information to the controller. At other predefined time segments, the controller drives the bidirectional link to issue commands to the link slave devices.

Under another aspect of the invention, the link slave devices and the link controller include protocol logic for communicating according to a protocol in which all slave devices communicate to the link controller at substantially the same period of time so that the latency for collecting information from the slave devices is independent of the number of such devices.

Other features and advantages will be apparent from the following disclosure, drawings, and claims.

BRIEF DESCRIPTION OF THE DRAWING

In the Drawing,

FIG. 2 shows a TDM format for organizing information according to a preferred embodiment;

FIG. 3 shows the organization of frame and status information of a preferred embodiment;

FIG. 4 shows the organization of a data segment of a preferred embodiment;

FIG. 5 shows the bit assignments of a preferred embodiment.

DETAILED DESCRIPTION

Figure 1:
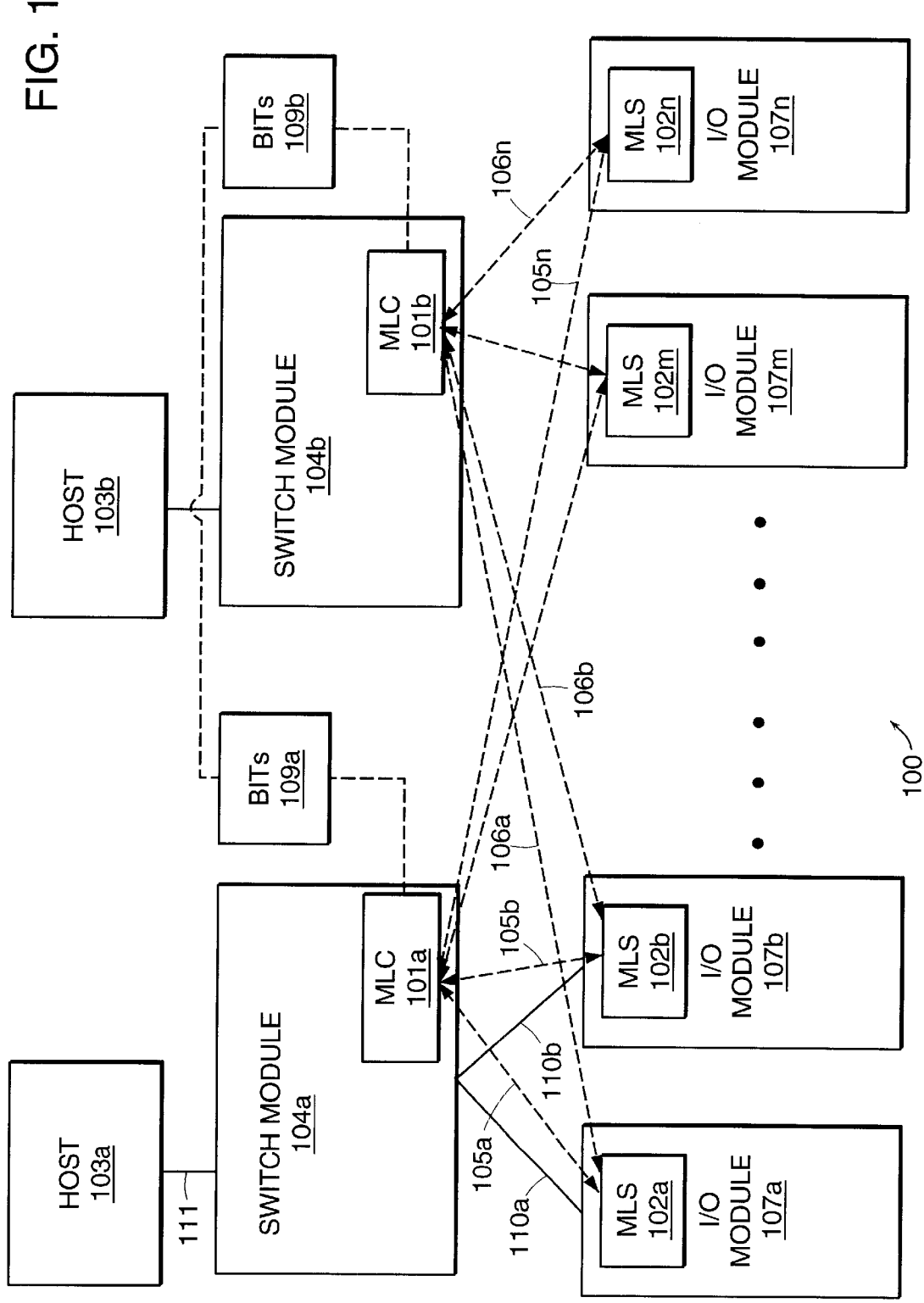
FIG. 1 depicts the architecture of a preferred embodiment.

Preferred embodiments of the invention provide a maintenance link system and method that allow a central point having maintenance link controller logic to communicate with an unspecified, plural number of cards or modules having maintenance link slave logic. The logic allows the central point to provide maintenance, configuration, initialization, or servicing operations to the plurality of cards or modules. A time-division communication scheme ensures deterministic latency for communications from the slaves to the controller. Consequently, regardless of the number of slaves, any given slave may communicate status, interrupt, or fault information to the controller within a known time. Preferably the maintenance link controller logic and maintenance link slave support redundancy to improve the fault tolerance of the maintenance link system and method.

Preferred embodiments of the invention are described below with reference to a communication system 100 shown in FIG. 1. The communication system 100, the functionality of the system 100 or its modules, or the number or arrangement of the various modules are not material to the invention or its embodiments. It is shown here and described briefly merely to provide an illustrative context for explaining preferred embodiments of the invention.

The communication system 100 includes a plurality of I/O modules 107a–107n that receive and send information on telecommunication links (not shown) such as T1 or T3 lines, or the like. The I/O modules 107a–107n, in turn, are connected to a pair of redundant switch modules 104a, 104b via communication links 110a–110n. Each switch module provide switch fabric (not shown) so that DS0 circuits or the like on one I/O module may be switchably connected to a corresponding circuit on another I/O module. To this end, each switch module 104 is controlled by a corresponding host 103, which is also responsible for managing session state information of the system. The first host/switch module pair (103a, 104a) and the second host switch module pair (103b,104b) of this exemplary embodiment are arranged in a hot standby arrangement, so that, if the pair that is currently controlling the system 100 malfunctions, the other pair may assume control. Though many clocking arrangements may be used, the embodiment of FIG. 1 operates using clocking information from a Building Integrated Time Sources (BITs) 109*a* synchronized to a second BITs 109*b*.

In the communication system 100 of FIG. 1, each host 103*a*, 103*b* communicates with a respective switch module 104*a*, 104*b*, via a corresponding bus 111*a*, 111*b*, such as a PCI bus. Moreover, the communication between a host 103 and a corresponding MLC 101*a* is arranged according to address-mapped communication techniques. In this fashion, the various registers and state that are to be read and/or written on the I/O modules 107*a*–107*n* for maintenance and control purposes are uniquely mapped in the address space of system 100. Persons skilled in the art, however, will appreciate that an address mapped technique for arranging and accessing the information is illustrative, not limiting.

In the communication system 100 of FIG. 1, maintenance and control software processes (not shown) execute on hosts 103*a*, 103*b* and need to access and set state on the I/O modules 107*a*–107*n*. In addition, the processes must respond to status, interrupt, and fault information from the I/O modules. For example, a fault from an I/O module may be conveyed to the MLC, which in turn will inform the host 103, for example via a host interrupt. The host interrupt service routine, in turn, may mark communication ports on the affected I/O module as unavailable and to log a service request. The host interrupt service routine may issue read commands to the appropriate addresses to access state on the affected I/O module.

To this end, the communication system 100 uses the maintenance link system and method of preferred embodiments. The maintenance link system includes a maintenance link controller (MLC) 101*a* in serial and independent communication with a plurality of maintenance link slaves (MLS) 102*a*–102*n*. By way of illustration, in the communication system 100, the MLC 101*a* is placed on the switch module 104*a*, and the MLSs 102*a*–102*n* are placed on corresponding I/O modules 107*a*–107*n*. Each MLS 102*a*–102*n* is connected to the MLC 101*a* via a corresponding serial link, e.g., 105*a*, that is independent of all the other links 105*b*–105*n*.

In a preferred embodiment, the MLC and MLS are implemented as field programmable gate arrays (FPGAs), but persons skilled in the art will appreciate that each may be implemented in many ways, including by having the logic integrated into other gate arrays or components providing functionality to the system 100. Preferably, separate and independent back- or mid-plane traces are used for links 105*a*–105*n* between the MLC 101*a* and the MLSs 102*a*–102*n*. Separate (as opposed to shared) traces improve reliability. If one trace or pin fails only a portion of the overall maintenance link functionality is affected. The information on a given maintenance link 105*a* is checked for parity and framing integrity at the reception end of a given transaction (i.e., the MLS checks information sent by the MLC, and visa-versa). In this manner, maintenance or control software may isolate faults to a I/O module 107*a* or a switch module 104*a* by detecting errors, and identify whether a given I/O module 107*a* or switch module 104*a* was driving the link 105*a* at the relevant time.

The MLC 101 of a preferred embodiment includes logic (not shown) to detect operations to a defined system address space and to map those operations into read or write operations to one of MLSs 102*a*–102*n*. The MLC 101 further includes logic for serializing those operations to be transacted over a corresponding serial link 105 to the mapped MLS. Moreover, the MLC includes logic for monitoring, in parallel, all of the serial links 105*a*–105*n* at predetermined times to detect status, interrupt or fault information being conveyed by the MLSs 102*a*–102*n*. Thus, under one embodiment, the MLC 101 communicates with only one MLS at a time by sending serialized read and write commands over a corresponding link 105*a*, at certain times, and multiple MLSs may concurrently communicate with the MLC in parallel at other times.

Under one embodiment, a time-division multiplex scheme is used to organize the information conveyed on the serial, bidirectional links 105*a*–105*n*. More specifically, information is conveyed so that a given period on a link is organized to have one portion for sending information from MLC 101 to a MLS, e.g., 102*a*, and another portion for sending information from the MLSs to a MLC.

During the one portion of the time period, the MLC 101 may convey command operations to one of the I/O modules 107*a*–107*n* via a corresponding MLS 102*a*–102*n*. In one embodiment, these commands are write/read operations, in which an address and/or data are sent from the MLC 101 to a desired MLS 102. The MLS then performs a register or memory write/read in accordance with the command. If the command was a read operation, once the MLS has retrieved the data it is eventually returned to the MLC 101 via the serial link 105 during a time in which the MLS may drive the link 105. In one embodiment, the MLC is designed to generate an interrupt signal, for example, to be received by the host processor 103 whenever a MLS returns read data to the MLC.

As stated above, each MLS 102*a*–102*n* may transmit information independently from the others and in parallel with the others. Consequently, the operating state of all the I/O modules 107*a*–107*n* can be accumulated in one frame by the MLC 101 and in turn by the maintenance or control software (not shown). By collecting the information in parallel, a deterministic latency is achieved, as opposed to collecting things one card at a time which would make the collection time a function of how many cards are in the system.

In one embodiment, the serial communication on the links 105*a*–105*n* occurs at a clock rate of 12.512 MHz. Preferably, each MLC and MLS have synchronous 12.512 MHz clocks, for example, derived from a global clock of 50.048 MHz, and a frame sync signal to assure a synchronous phase relationship on all modules.

In one embodiment, the information conveyed on the links 105*a*–105*n* is a serial stream having 1564 bits of information every 125 microseconds. With reference to FIG. 2, the 1564 bit stream is divided into one 128-bit frame/status subframe 205, eleven 128-bit maintenance link (ML) subframes 210–260, and a 28-bit subframe 265. A given transaction may be organized into multiple frames, and each frame in turn is organized into multiple ML subframes, during which commands may be issued to an MLS and status or data returned from the MLS to the MLC. If the host wants to read a register or write to a register on particular module, for example, the MLC can send an address that is unique in that each register has a unique address, including relative to the same register on another module, because each module has its own physical slot identifier.

FIG. 3 shows the organization of the frame/status subframe 205. An 8-bit frame word 305 and a bank select field 310 are driven by MLC 101. In one embodiment, the frame word 305 is driven with alternating pattern of bits to insure that the parity calculated by the MLS 102*a* changes. Thus if over a period of three 125 microsecond periods the parity acknowledge bit 315 does not change, it will be assumed that the link 105 is faulty. The bank select field 310 is a bit used by MLSs 102a–102n to coordinate the switching of the ATM connection memory.

The MLSs drive the parity acknowledge bit 315 (a parity bit) and an Interrupt Status Word 320. The Interrupt Status Word is a 32-bit status word sent from the MLS indicating the status of critical systems, and used to allow a mailbox for messaging purposes to exist between the maintenance and control software utilizing the MLC and each I/O module using a MLC. An ISR Parity bit is sent by the MLS and reflects the odd-parity calculated over the length of the Interrupt Status Word. The ISR Word is thus dropped by the MLC 101 during error situations.

FIG. 4 shows the organization of the ML subframes 210–260. As shown, each subframe is divided into three segments. In the first segment 405, the MLC 101 may drive the link in serial form with command (e.g., read, write, no-operation), address, and data (for writes). A second segment 415 of the ML subframe is a buffer period in which the link 105 is not driven by with the MLC 101 or the MLS 102. In the third segment 410, the MLS 102 may driver the link 105 in serial form with status and/or data (e.g., in response to read commands).

FIG. 5 illustrates the bit assignments made within the frame of FIG. 3. Not all ML subframes are shown for clarity, but inspection should show that the bit assignments are repetitive across ML subframes. Some of the fields are described below.

Active Byte Lanes

Indicate which byte lanes of the 32-Bit Data Field are to be used when performing a write command.

Address Field

The address field contains the upper 28 most significant bits of the address sent to the MLS. The address is any valid address on the MLS.

Data Field

The data field contains the 32 bit word used during write commands.

Command Parity

This is the odd parity calculated over the command frame. If a parity error occurs the command is dropped and the line card will try to respond with error message.

STS/ACK

This is the reply sent by the MLS after receiving a command from the MLC 101. In one embodiment, two replies are supported. ("1001"—command processed or "1100"—could not process command")

Return Data Field

The data returned to a MLC 101 after a read command has been sent.

Return Parity

The odd parity calculated over the STS/ACK and the Return Data Fields. If the MLC 101 determines that a parity error has occurred than the return data field is ignored.

The programming model of a preferred embodiment consists of two banks of PCI memory mapped registers, that allow access to the various local and system facilities. The two banks consist of a local hardware control space and maintenance link space and a range of addresses allowing access to the local on-card devices. The base addresses for these two banks are conFIG.d in the PCI Configuration area of the MLS.

Some of the registers in local hardware control memory area allow different write modes. These registers have two bits which control the type of write to perform. The write modes are as follows:

CMD: 1 1 Normal Write: This mode allows all bits to be directly written.

CMD: 1 0 Set Mode: All bits that are written as a '1' are set.

CMD: 0 1: Clear Mode: All bits set to a '1' are cleared.

CMD: 0 0: No Operation

Each bit in every register has a listed reset value and interrupt type if applicable. The reset value is the value of the bit after power-up, PCI reset or general global reset from the radial resets controlled by the MLC 101.

The interrupt type indicates what causes this bit to generate an interrupt. The two categories are as follows:

CHANGE: A label of change indicates that this bit causes an interrupt if it experiences a change in logic level either going from a 0 to 1 or from a 1 to a 0.

LEVEL: A label of level indicates that this bit causes an interrupt if the bit is set to a logic level of '1';

R_EDGE: Refers to a rising edge, thus an interrupt will only occur during a 0 to 1 transition.

F_EDGE: Refers to a falling edge, thus an interrupt will only occur during a 1 to 0 transition.

Under a preferred embodiment, most interrupts have three associated registers that allow control and reporting of the interrupt. There is usually a status register, which indicates the current value of a signal. Then associated with the status there are the interrupt and mask registers. The bits in the interrupt register are set according to the type of interrupt. (i.e. LEVEL,CHANGE etc) The mask register allows the interrupt bits to be selectively sent on to the processor or the next level summary register. A value of '0', (which is the reset value) will prevent the interrupt from being passed on to host processor or associated summary register while a value '1' will allow the interrupt to passed along.

Initially after a board Reset the values of the interrupt registers will be set to zero. But then a few clock ticks after reset the interrupt values will change according to the inputs to the specific registers. After reset all of the Interrupt Mask registers will be zero, thus masking any of the possible interrupt sources.

The system of FIG. 1 shows an arrangement in which the MLC and MLSs are arranged in redundant fashion. Thus, there are two MLCs 101 in hot standby arrangement each communicating with the plurality of MLSs 102a–n. The use of redundant MLCs enhances reliability of the system and the maintenance link itself. The MLCs of the above embodiments are illustrated as being placed on the switch modules 104 but there is no fundamental requirement for such placement. Instead criteria such as availability of real estate and logic gates may be used in determining preferred placements for such logic and circuitry.

In the redundant arrangement, mastership logic is used to determine which MLC at a given time is master.

In the embodiment described above, the MLS 102 only responds to commands from one central card, as determined by mastership logic. However, the slave devices send updates to both central controllers.

For many telecommunication contexts, fault isolation and fail-over has to occur in tens of milliseconds in order for the users to not experience any service disruption. The deterministic latency offered by the above embodiments facilitates meeting this goal.

The communication path allows the "Working" host/switch module pair to access control and status registers on each line card 107a–n while also allowing it to perform transactions on a local processor bus of the I/O module or other card having the MLS. This allows a low level means of programming memory, providing regular status updates to the embedded CPU host, and peripheral configuration.

There is a separate communication path (not shown) that allows software running on the two host processors 103a–b to exchange information. This host software can compare detected fault information from the two central controllers to further isolate faults. If both central controllers are detecting faults from a slave device on the IO Module, then the fault is isolated to the IO Module.

Furthermore, the slave device reports faults received from either central device back to the central device. With this feature the central Maintenance Link Controller can detect that the other central Maintenance Link Controller is causing faults on one or more IO Modules.

Having described an exemplary embodiment, it should be apparent to persons of ordinary skill in the art that changes may be made to the embodiment described without departing from the spirit and scope of the invention.

What is claimed is:

1. A system for monitoring and maintaining a plurality of modules, comprising:

a plurality of link slave devices, in which each module of the plurality of modules includes at least one link slave device;

a link controller;

a plurality of individual serial, bidirectional connections, each connecting the controller to a corresponding link slave device;

wherein the link slave devices and the link controller include protocol logic for communicating according to a bidirectional protocol in which at predefined time segments and predefined periodicity the link slave devices can drive the corresponding bidirectional link to the controller to provide maintenance information to the controller, and in which at other predefined time segments the controller can drive the bidirectional link to issue commands to the link slave devices.

2. A system for monitoring and maintaining a plurality of modules, comprising:

a plurality of link slave devices, in which each module of the plurality of modules includes at least one link slave device;

a link controller;

a plurality of bidirectional connections, each connecting the controller to a corresponding link slave device;

wherein the link slave devices and the link controller include protocol logic for communicating according to a protocol in which all slave devices communicate to the link controller at substantially the same period of time so that the latency for collecting information from the slave devices is independent of the number of such devices.

3. A system for monitoring and maintaining a plurality of modules, comprising:

a plurality of link slave devices, in which each module of the plurality of modules includes at least one link slave device;

a link controller;

a plurality of connections, each connecting the controller to a corresponding link slave device;

wherein the link slave devices and the link controller include protocol logic for communicating according to a protocol in which all slave devices communicate status and interrupt information to the link controller and the link controller communicates command operations to the slave device.

4. The system of claim 1, further comprising a second link controller, wherein the slave devices are connected to the second link controller with independent connections and wherein the slave devices communicate to both the first and second controllers simultaneously.

5. A method of monitoring and maintaining a plurality of modules, comprising the acts of:

establishing individual serial, bidirectional connections between a link controller and a plurality of link slave devices, in which each module of the plurality of modules includes at least one link slave device;

at predefined time segments and predefined periodicity, the link slave devices driving the corresponding bidirectional link to the controller to provide maintenance information to the controller, and at other predefined time segments, the controller driving the bidirectional link to issue commands to the link slave devices.

6. A method of monitoring and maintaining a plurality of modules, comprising the acts of:

establishing individual serial, bidirectional connections between a link controller and a plurality of link slave devices, in which each module of the plurality of modules includes at least one link slave device;

all slave devices communicating to the link controller at substantially the same period of time so that the latency for collecting information from the slave devices is independent of the number of such devices.

7. The system of claim 1 wherein the protocol includes fault detection logic.

8. The system of claim 1 wherein the protocol includes framing error logic.

9. The system of claim 1 wherein the link slave devices drive the corresponding bi-directional link to the controller without requirement of a polling command from the controller.

10. The system of claim 2 wherein the protocol includes fault detection logic.

11. The system of claim 2 wherein the protocol includes framing error logic.

12. The system of claim 2 wherein the link slave devices drive the corresponding bi-directional connection to the controller without requirement of a polling command from the controller.

13. The system of claim 3 wherein the protocol includes fault detection logic.

14. The system of claim 3 wherein the protocol includes framing error logic.

15. The system of claim 3 wherein the link slave devices drive the corresponding connection to the controller without requirement of a polling command from the controller.

* * * * *